United States Patent
Aoishi

(10) Patent No.: US 7,031,112 B2
(45) Date of Patent: Apr. 18, 2006

(54) METHOD OF PROCESSING METAL PLATE MEMBER OF DISC CARTRIDGE

(75) Inventor: Harumi Aoishi, Odawara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 110 days.

(21) Appl. No.: 10/680,155

(22) Filed: Oct. 8, 2003

(65) Prior Publication Data

US 2004/0071077 A1   Apr. 15, 2004

(30) Foreign Application Priority Data

Oct. 9, 2002   (JP) .............................. 2002/295525

(51) Int. Cl.
*G11B 23/03*   (2006.01)

(52) U.S. Cl. ...................................... 360/133

(58) Field of Classification Search ..................... None

See application file for complete search history.

(56) References Cited

U.S. PATENT DOCUMENTS

| | | | | |
|---|---|---|---|---|
| 4,201,111 A * | 5/1980 | Kuttler | .................. | 411/528 |
| 4,291,935 A * | 9/1981 | Badoz et al. | .............. | 439/399 |
| 4,868,701 A * | 9/1989 | Kato | .................. | 360/133 |
| 5,014,152 A * | 5/1991 | Sasaki | .................. | 360/135 |
| 5,755,448 A * | 5/1998 | Kanaan et al. | ............ | 279/75 |
| 5,903,542 A * | 5/1999 | Sandell et al. | ............ | 720/735 |
| 6,275,353 B1 * | 8/2001 | Briggs | ............ | 360/97.02 |
| 6,315,111 B1 * | 11/2001 | Sutherland | ................ | 206/188 |
| 2002/0131207 A1 * | 9/2002 | Oishi et al. | ................ | 360/133 |

FOREIGN PATENT DOCUMENTS

JP   57-2446 A   *  1/1982
JP   57-160525 A   *  10/1982

* cited by examiner

*Primary Examiner*—Jefferson Evans
(74) *Attorney, Agent, or Firm*—Sughrue Mion, PLLC

(57) ABSTRACT

A magnetic disc is housed for rotation in a flat casing having a metal shell. The magnetic disc is supported for rotation in the casing by a tubular shaft formed by barring of a metal blank for forming the metal shell. A hole is formed in a part of the metal blank where the tubular shaft is to be formed. A plurality of slits are formed prior to barring in the part where the tubular shaft is to be formed.

5 Claims, 9 Drawing Sheets

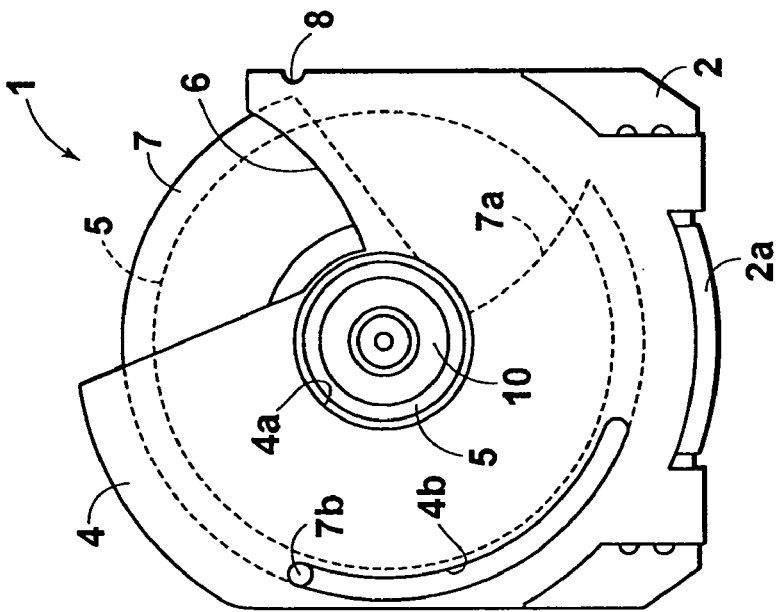
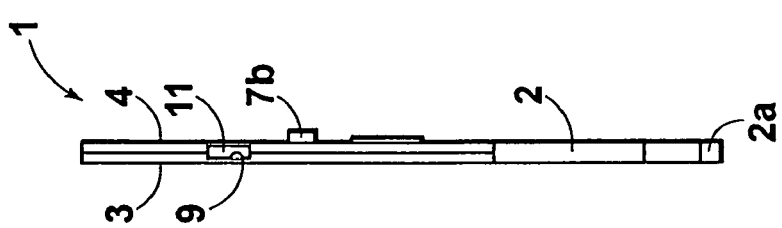
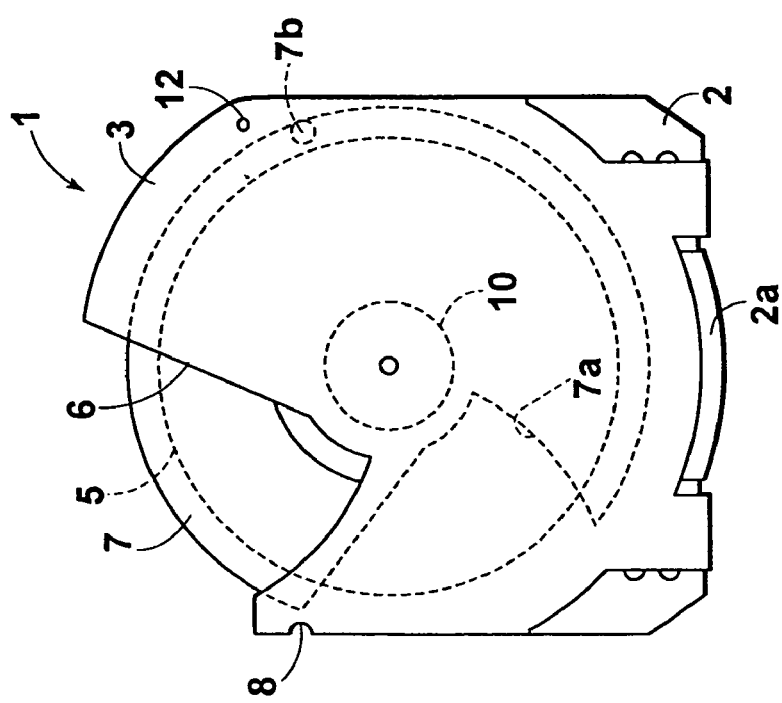

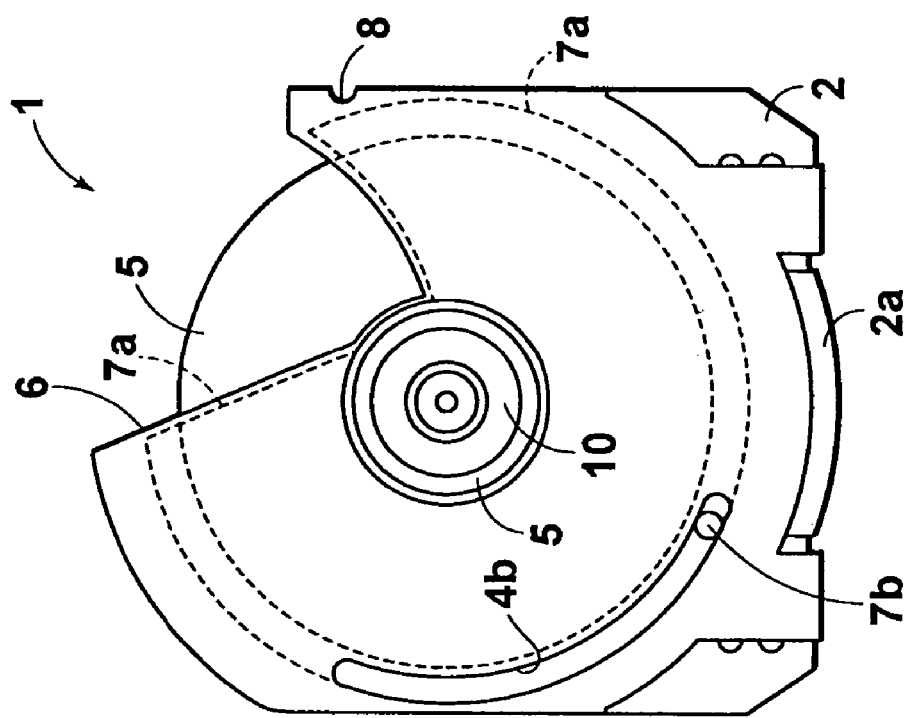
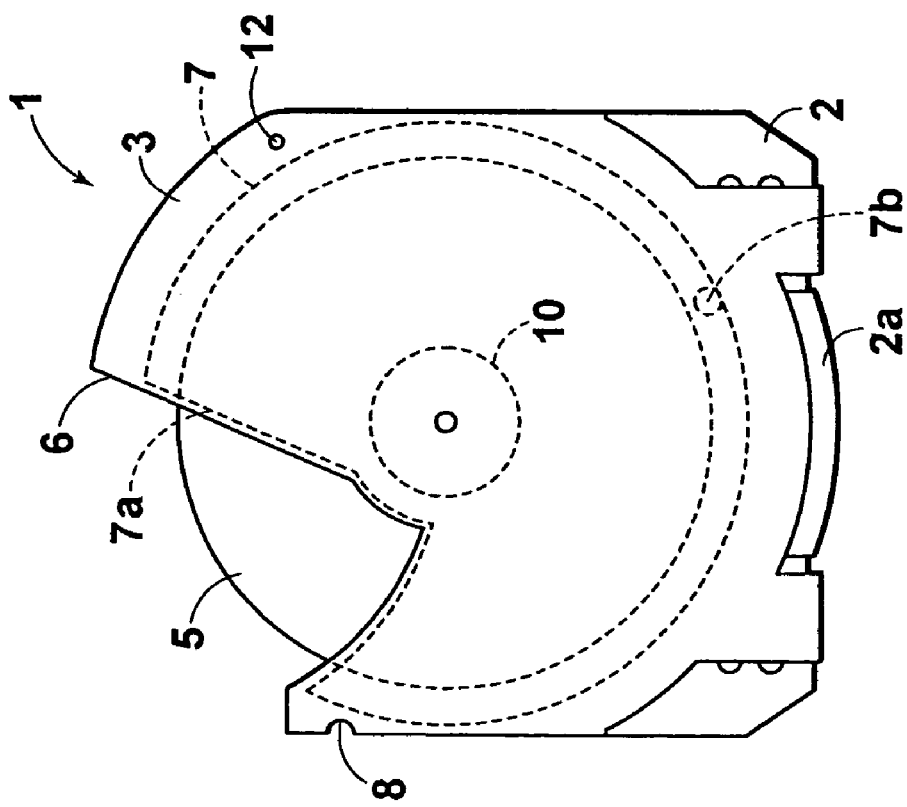

METHOD OF PROCESSING METAL PLATE MEMBER OF DISC CARTRIDGE

BACKGROUND OF THE INVENTION

1. Field of the Invention

This invention relates to a small-size disc cartridge comprising a magnetic disc housed for rotation in a flat casing having a metal shell, and more particularly to a method of carrying out plastic processing involving stretching such as barring on the metal shell or other metal plate members and a disc cartridge whose tubular shaft is formed by the method.

2. Description of the Related Art

Recently, magnetic discs are increasingly given a large capacity and are increasingly made in a small size. Structural parts of a magnetic disc cartridge housing the magnetic disc for rotation have been complicated in shape and at the same time, a high dimensional accuracy of the structural part has been required.

Thin metal plate members are often used as structural parts of a magnetic disc cartridge by processing based on their stretchability. Barring and pressing which are common methods of processing a metal plate are also based on stretchability of a metal plate and are used, for instance, for forming a projection, forming a bent portion or forming a curved surface.

FIGS. 8A to 8E are for illustrating an example of barring employed when a projection is formed in a metal plate. A small diameter hole 21 is first formed in a metal plate member 20 as shown in FIG. 8A. Then a smaller diameter portion 31 of a barring tool 30 comprising cylindrical smaller and larger diameter portions 31 and 33 provided on opposite end portions of a conical body portion 32 which is a truncated cone in shape is inserted into the hole 21 as shown in FIG. 8B.

When the tool 30 is subsequently forced, a part 22 of the metal plate member 20 circumscribing the hole 21 is expanded upward as shown in FIG. 8C as the conical body portion 32 enters the hole 21, and further expanded and stretched to be plastically deformed as the larger diameter portion 33 enters the hole 21 as shown in FIG. 8D. The metal plate member 20 is finally processed to a member having a cylindrical portion 23 projecting upward by a height h, the distance between the upper surface 20a of the metal plate member 20 and the upper surface 23a of the cylindrical portion 23 as shown FIG. 8E and FIG. 9A. Such a cylindrical portion is formed in the metal shell of a disc cartridge for supporting for rotation the rotary shutter as will be described later.

However, when the limit of stretching of the metal material is exceeded during barring of such a cylindrical portion 23, cracks C are produced as shown in FIG. 9B, which can deteriorates quality and/or yield of the product. The cracks C are apt to be produced in the cylindrical portion 23 near the upper surface 23a thereof as shown in FIG. 9B. Especially when the cylindrical portion 23 functions as a tubular shaft for supporting another part for rotation, the cracks C are expanded and/or increased in number, for instance, when the upper end portion of the cylindrical portion is caulked to form a flange for preventing dismounting of said another part from the cylindrical portion 23.

Further, when a curved surface portion 25 is formed in the metal plate member 20 by drawing as shown in FIG. 10A, cracks C are apt to be produced in a central portion of the curved surface portion 25 as shown in FIG. 10B.

Such cracks C can produce metal fractions, which can seriously damage the disc cartridge. Production of such cracks C depends upon the thickness and/or the stretchability of the metal material, and/or the processing speed and it is very difficult to control the production site and/or the size of the cracks. Conventionally, production of such cracks C has been suppressed by enhancement of the limit of acceptance of the material and/or suppression of fluctuation in the processing speed. However such provision is sometimes not effective and at the same time, adds to the cost.

SUMMARY OF THE INVENTION

In view of the foregoing observations and description, the primary object of the present invention is to provide a method of carrying out plastic processing involving stretching such as barring on the metal shell or other metal plate members which can suppress influence of the factors of fluctuation described above on the yield of the products and a disc cartridge whose tubular shaft for supporting for rotation the rotary shutter is formed by the method.

In accordance with a first aspect of the present invention, there is provided a method of carrying out plastic processing involving stretching on a metal shell of a disc cartridge comprising a magnetic disc housed for rotation in a flat casing having the metal shell or on another metal plate member of the metal shell, wherein the improvement comprises the step of forming a slit in advance in a part on which the plastic processing is to be carried out.

The plastic processing involving stretching may be barring. When the plastic processing is barring, slits are formed about a hole to be formed prior to the barring.

In one embodiment of the method of the first aspect of the present invention, the housing is provided with an opening for giving access to the disc housed therein to a recording/reproducing head of a drive system and a rotary shutter which opens and closes the opening and the rotary shutter is mounted for rotation on the metal shell by way of a tubular shaft which is formed by barring.

The plastic processing involving stretching may be drawing. Also, in this case, a slit is formed in advance in a part on which the plastic processing is to be carried out.

In accordance with a second aspect of the present invention, there is provided with a disc cartridge comprising a magnetic disc housed for rotation in a flat casing having a metal shell, the housing being provided with an opening for giving access to the disc housed therein to a recording/reproducing head of a drive system and a rotary shutter being mounted for rotation on the metal shell to open and close the opening, wherein the rotary shutter is supported for rotation on the metal shell by way of a tubular shaft which is formed on the metal shell by barring and is provided with a slit in the free end portion thereof.

In accordance with the present invention, stretching of the part to be processed is interrupted by the slit and accordingly, no crack is produced even in the tip of a cylindrical portion.

This improves the yield and the quality of the structural parts of the disc cartridge and allows fluctuation in stretchability, thickness and/or the like of the metal blank to some extent, which widens the limit of acceptance of the material and reduces the cost.

When slits are formed about the hole prior to barring, slits remain about the tip of a cylindrical portion formed by the barring.

BRIEF DESCRIPTION OF THE DRAWINGS

FIG. 1A is a plan view of a magnetic disc cartridge in accordance with an embodiment of the present invention with the rotary shutter held in the closed position, FIG. 1B is a right side view of the same with the rotary shutter held in the closed position, FIG. 1C is a bottom view of the same with the rotary shutter held in the closed position, FIG. 2A is a plan view of the magnetic disc cartridge shown in FIG. 1 with the rotary shutter held in the open position, FIG. 2B is a bottom view of the same with the rotary shutter held in the open position.

DESCRIPTION OF THE PREFERRED EMBODIMENT

Figure 3:
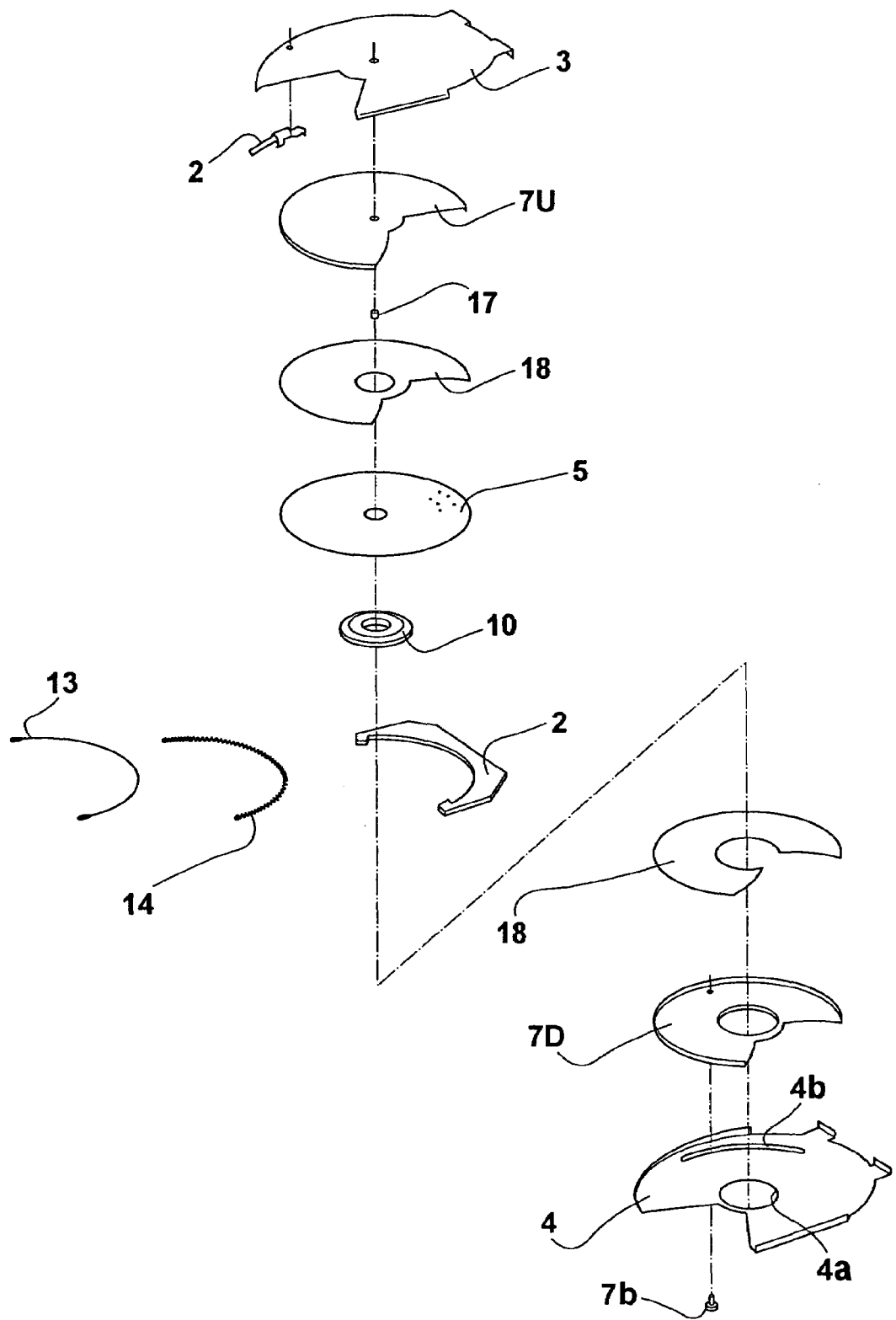
FIG. 3 is an exploded perspective view of the magnetic disc cartridge shown in FIG. 1, FIGS. 4A and 4B are views respectively showing the magnetic disc cartridge shown in FIG. 1 in the states where the rotary shutter is closed and opened with the upper shell half and the magnetic disc removed.

The present invention will be described in conjunction with a case where a tubular shaft for rotatably supporting a rotary shutter of a "clik!®", a subminiature magnetic disc cartridge, is formed in the metal shell thereof.

As shown in FIGS. 1A to 1C, 2A and 2B and 3, the magnetic disc cartridge 1 of this embodiment comprises a 40 MB magnetic disc (1.8 inches in diameter) housed for rotation in a flat housing formed by a resin frame 2 and upper and lower shell halves 3 and 4. The resin frame 2 is provided with a push portion 2a, each of the upper and lower shell halves 3 and 4 is formed of a stainless steel plate about 0.2 mm thick and the flat housing is 50 mm in width, 55 mm in length and 1.95 mm in thickness.

The magnetic disc cartridge 1 is provided with a V-shaped opening 6 which gives access to the magnetic disc 5 to a magnetic head of a drive system into which the magnetic disc cartridge 1 is inserted, and a rotary shutter 7 which is moved between its closed position where it closes the opening 6 and its open position where it opens the opening 6. As shown in FIG. 3, the rotary shutter 7 comprises upper and lower shutter halves 7U and 7D which are engaged with each other. The upper and lower shutter halves 7U and 7D are respectively supported for rotation on the upper and lower shell halves 3 and 4. Liners 18 are interposed between the magnetic disc 5 and the upper shutter half 7U and between the magnetic disc 5 and the lower shutter half 7D.

A notch 8 which is brought into engagement with a member of a drive system, when the disc cartridge 1 is inserted into the drive system, to position the disc cartridge in the drive system is provided on the housing in a leading end portion of the left (as seen in FIG. 1A) side surface thereof, and a small window 9 for giving access to a shutter lock member 11 for locking the rotary shutter 7 in its closed position is provided on the housing in a leading end portion of the right (as seen in FIG. 1A) side surface thereof.

A circular central opening 4a for giving access to a center core 10 of the magnetic disc 5 and an arcuate slit 4b concentric with the rotary shutter 7 are formed in the lower shell half 4 of the housing. A shutter knob 7b which projects outward through the slit 4b to be moved along the arcuate slit 4b when the rotary shutter 7 is opened and closed is fixed to the lower shutter half 7D.

Figure 4A:
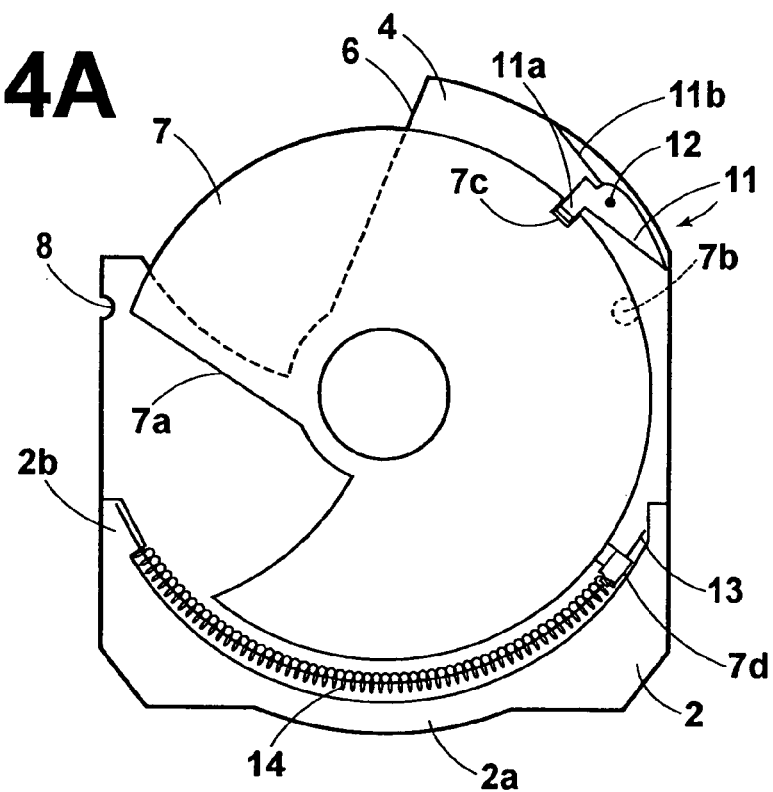
Figure 4B:
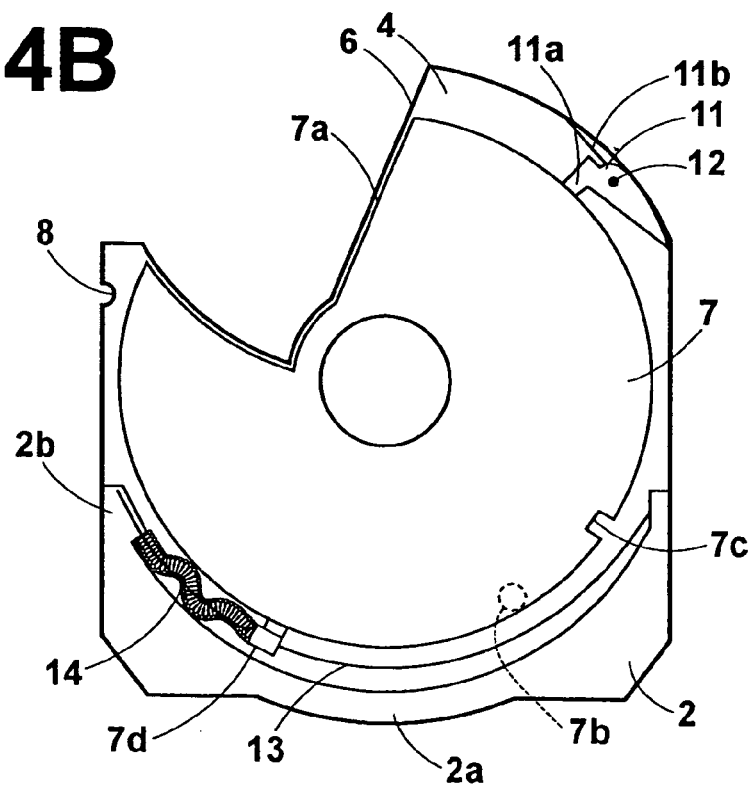

FIGS. 4A and 4B respectively show the magnetic disc cartridge 1 in the states where the rotary shutter 7 is closed and opened with the upper shell half 3 and the magnetic disc 5 removed.

The shutter lock member 11 is provided on its tip with an engagement projection 11a which is brought into engagement with an engagement recess 7c to lock the rotary shutter 7 in its closed position is mounted for rotation on a pivot 12 provided in the housing and urged by a spring plate 11b toward its locking position where the engagement projection 11a is engaged with the engagement recess 7c to lock the rotary shutter 7 in the closed position (in the counterclockwise direction in FIGS. 4A and 4B). When the disc cartridge 1 is inserted into a drive system, a lock release member of the drive system pushes the shutter lock member 11 through the small window 9 to disengage the engagement projection 11a from the engagement recess 7c, thereby releasing the rotary shutter 7.

The rotary shutter 7 is urged toward its closed position (in the counterclockwise direction in FIGS. 4A and 4B) by an elongated coiled spring 14 of a small diameter. The coiled spring 14 is supported by a guide wire 13 which extends along the outer periphery of the rotary shutter 7 with its one end engaged with the frame 2 at a portion 2b opposed to the outer periphery of the rotary shutter 7 and its the other end portion slidably extending through a support member 7d fixed to the outer periphery of the rotary shutter 7. The coiled spring 14 is compressed between the portion 2b of the frame 2 and the support member 7d to be stretched and contracted along the guide wire 13 as shown in FIG. 4A and urges the rotary shutter 7 in the closed position thereof. When the rotary shutter 7 is rotated in the clockwise direction as seen in FIG. 4 (after the lock is released) from this state, the coiled spring 14 is compressed as shown in FIG. 4B.

Figure 5:
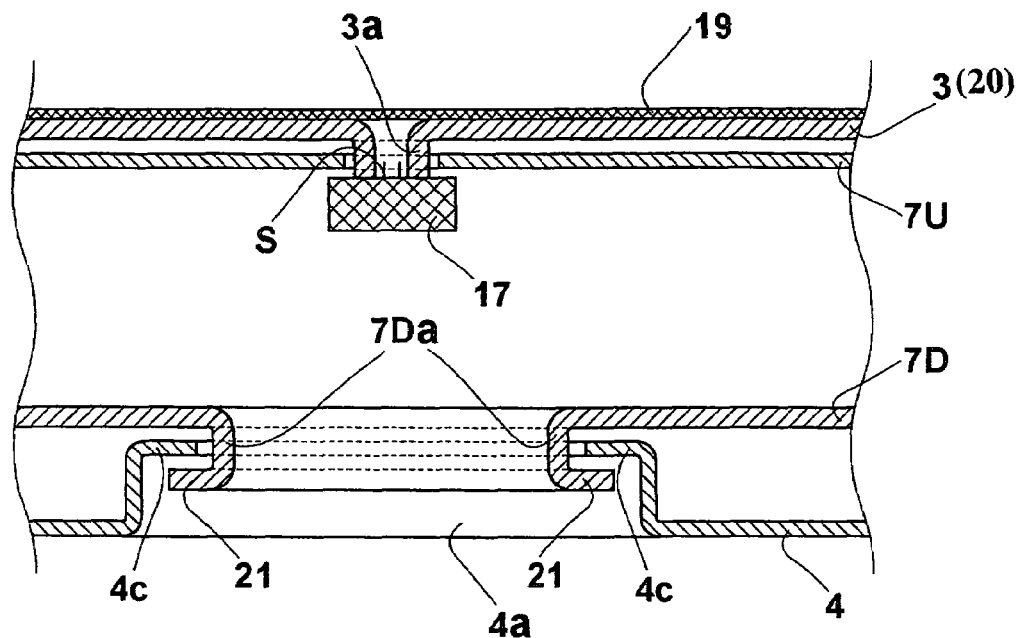
FIG. 5 is an enlarged cross-sectional view showing the structure for supporting the rotary shutter for rotation with the magnetic disc, the center core and the liners abbreviated.

FIG. 5 is an enlarged cross-sectional view showing the structure for supporting the rotary shutter 7 for rotation with the magnetic disc 5, the center core 10 and the liners 18 abbreviated.

In FIG. 5, the peripheral wall of the central opening 4a for giving access to the center core 10 of the magnetic disc 5 is projected inside the housing to form a bearing 4c which supports for rotation the lower shutter half 7D. A large diameter cylindrical portion 7Da is formed along the edge of a central hole of the lower shutter half 7D to project outward (downward) and is inserted into the bearing 4c as a tubular shaft. The tip end portion of the cylindrical portion 7Da is caulked to form a flange 21 for preventing disengagement of the cylindrical portion 7Da from the bearing 4c. The lower shutter half 7D is thus supported for rotation.

A small diameter cylindrical portion 3a formed by barring projects inward (downward) from a central portion of the upper shell half 3. A plurality of slits S extends from the tip of the small diameter cylindrical portion 3a in the tip end portion of the small diameter cylindrical portion 3a.

The cylindrical portion 3a is inserted into a central hole of the upper shutter half 7U, and a center pin 17 is welded to the tip of the cylindrical portion 3a beyond the central hole of the upper shutter half 7U to prevent disengagement of the cylindrical portion 3a from the upper shutter half 7U. Further, a label 19 applied to the upper surface of the upper shell half 3 covers the small hole formed for barring.

Figure 6:
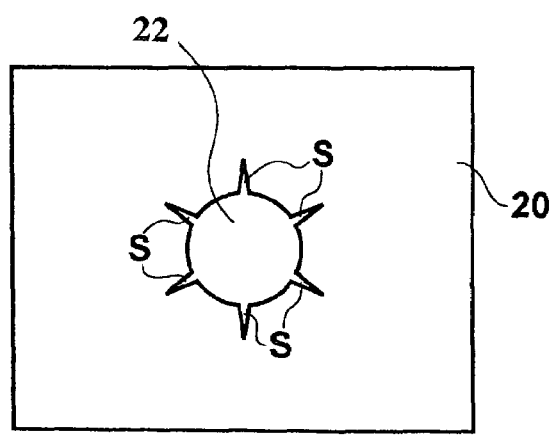
FIG. 6 is a fragmentary plan view showing a plurality of slits formed about a hole formed in a metal plate member prior to barring.

FIG. 6 is a fragmentary plan view showing a plurality of slits S formed about a hole 22 formed in a metal plate member 20 (corresponding to the upper shell half 3 as shown in FIG. 5) prior to barring when a cylindrical portion is formed in a upper shell half 3 by the barring.

Figure 7:
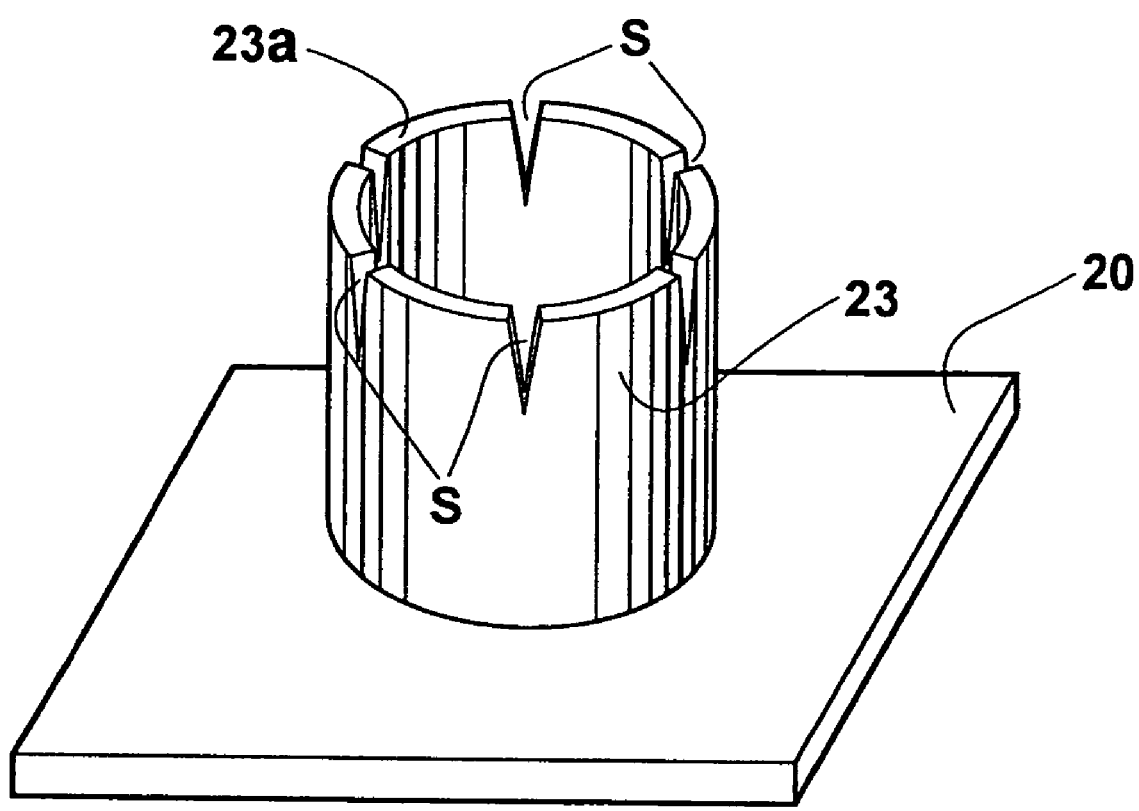
FIG. 7 is a perspective view showing a cylindrical body formed in accordance with the present invention.
Figure 8A:
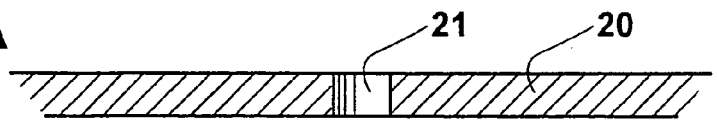
FIGS. 8A to 8E are views for illustrating the barring.
Figure 8B:
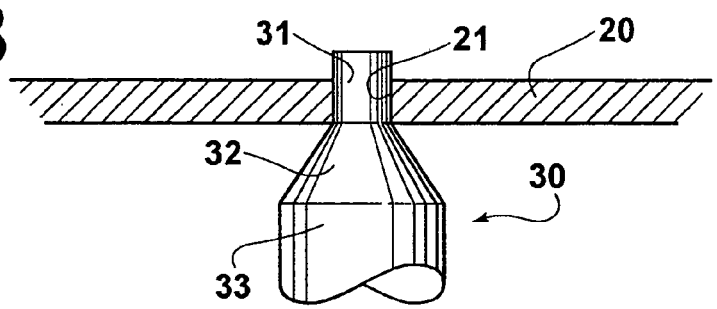
Figure 8C:
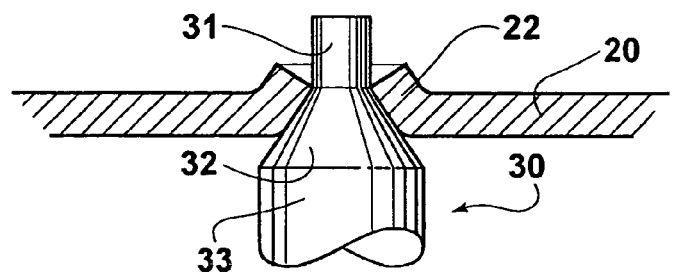
Figure 8D:
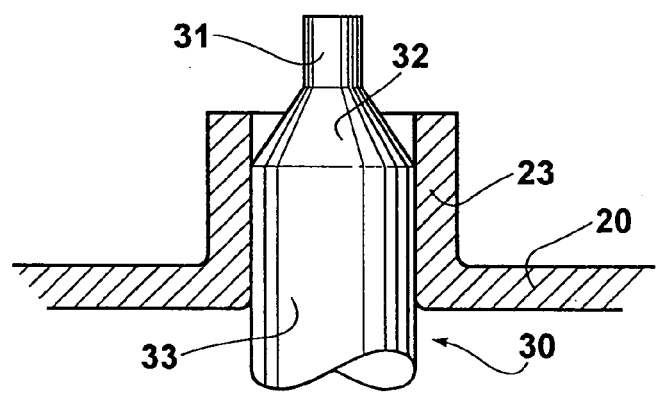
Figure 8E:
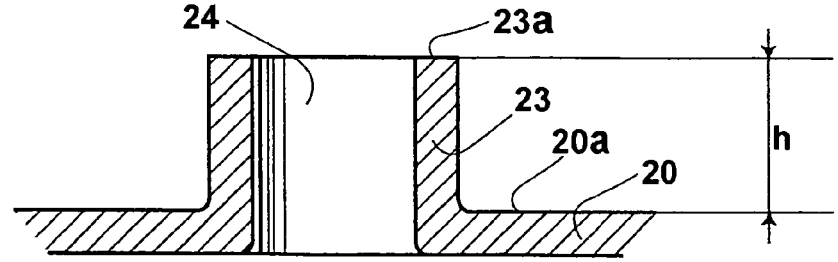
Figure 9A:
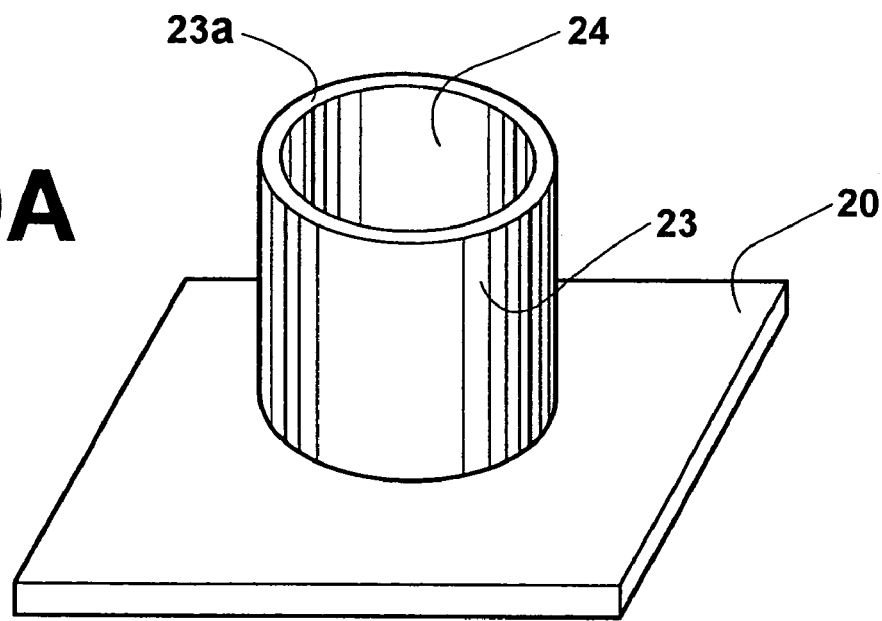
FIG. 9A is a perspective view showing a cylindrical portion to be formed by barring.
Figure 9B:
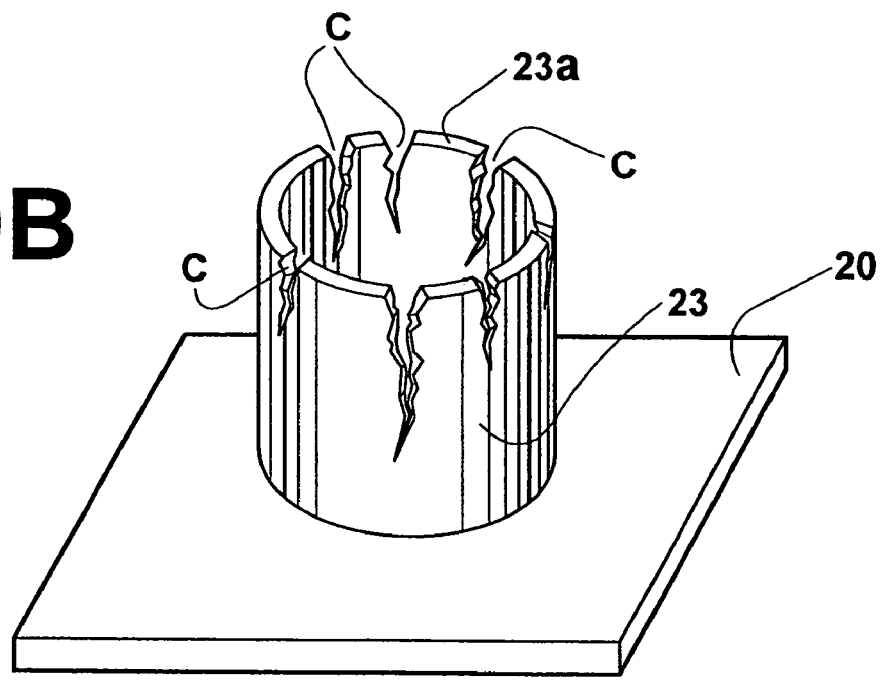
FIG. 9B is a perspective view showing a cylindrical portion formed by barring in accordance with the prior art.

When slits S are formed about the hole 22 prior to barring, stretching of the part to be processed is interrupted by the slits S and accordingly, production of a crack C is prevented even in the tip of a cylindrical portion 23a though slits S remain about the tip of the cylindrical portion 23a formed by the barring as shown in FIG. 7.

This improves the yield and the quality of the metal plate member 20 of the disc cartridge 1 and allows fluctuation in stretchability, thickness and/or the like of the metal blank to some extent, which widens the limit of acceptance of the material and reduces the cost.

Figure 10A:
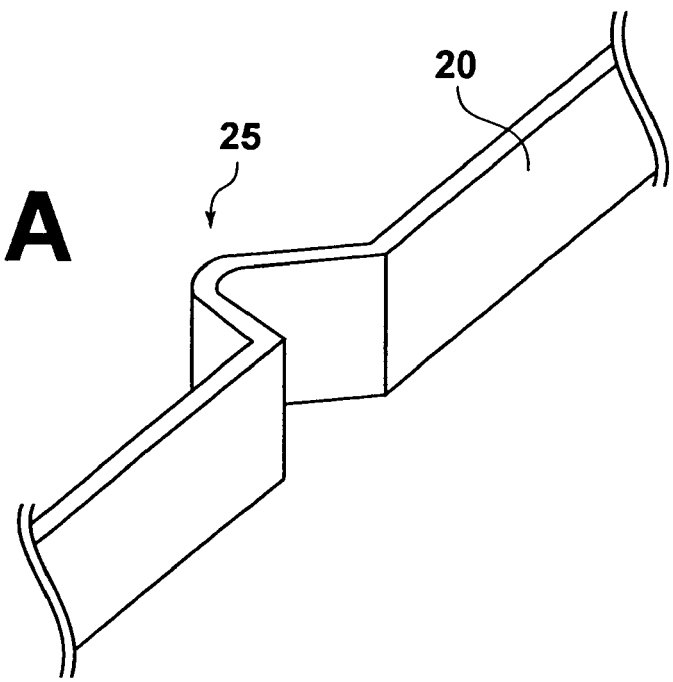
FIG. 10A is a perspective view showing a curved surface portion to be formed by drawing.
Figure 10B:
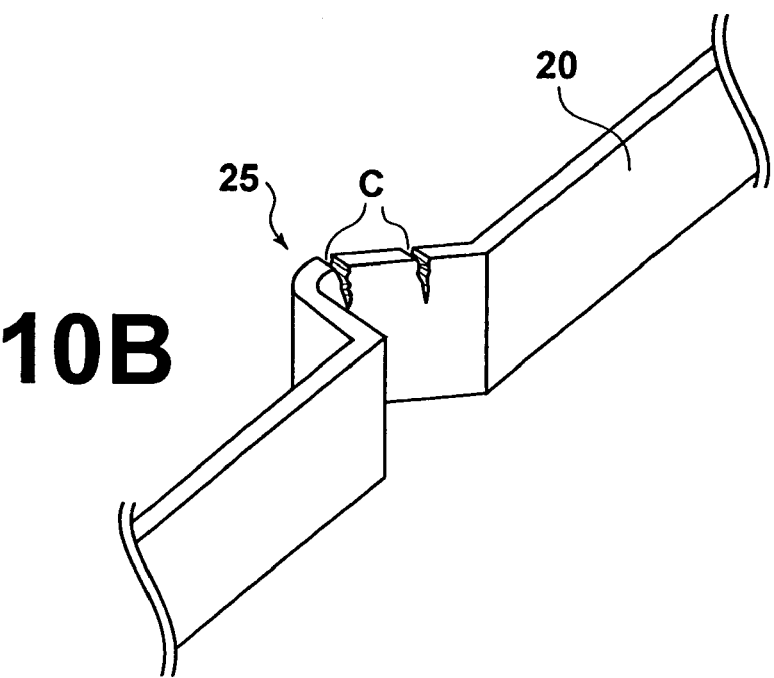
FIG. 10B is a perspective view showing a curved surface portion formed by drawing in accordance with the prior art.

Though, not shown, also in drawing, e.g., in forming the curved surface portion 25 (FIG. 10) by drawing, production of a crack C can be prevented by forming prior to drawing a slit S where a crack C can be produced.

What is claimed is:

1. A method of carrying out plastic processing, comprising:
    stretching a metal shell of a disc cartridge or another metal plate member of the metal shell, and
    forming a slit, prior to stretching, in a part of the metal shell or the other metal plate member on which the plastic processing is to be carried out,
    wherein the disc cartridge comprises a magnetic disc housed for rotation in a flat casing.

2. The method as defined in claim 1 in which the plastic processing is barring and a plurality of the slit are formed about a hole to be formed prior to the barring.

3. The method as defined in claim 2 in which the housing is provided with an opening for giving access to the disc housed therein to a recording/reproducing head of a drive system and a rotary shutter which opens and closes the opening, and the rotary shutter is mounted for rotation on the metal shell by way of a tubular shaft which is formed by barring.

4. The method as defined in claim 1 in which the plastic processing involving stretching is drawing.

5. A disc cartridge comprising.
    a magnetic disc housed for rotation in a flat casing having a metal shell, the housing being provided with an opening for giving access to the magnetic disc housed therein to a recording/reproducing head of a drive system; and
    a rotary shutter being mounted for rotation on the metal shell to open and close the opening,
    wherein, the rotary shutter is supported for rotation on the metal shell by way of a tubular shaft which is formed on the metal shell by barring and is provided with a slit in a free end portion thereof.

* * * * *